United States Patent [19]

Rodriguez, Jr. et al.

[11] Patent Number: 5,692,821
[45] Date of Patent: Dec. 2, 1997

[54] METHOD AND SYSTEM FOR THERMAL MANAGEMENT WITHIN A DISPLAY DEVICE

[75] Inventors: Ernesto Melquiades Rodriguez, Jr.; Xiaowei Zhao, both of Round Rock, Tex.

[73] Assignee: Minnesota Mining and Manufacturing, Saint Paul, Minn.

[21] Appl. No.: 673,292

[22] Filed: Jun. 28, 1996

[51] Int. Cl.$^6$ ................................................. G03B 21/14
[52] U.S. Cl. ............................. 353/52; 353/61; 362/373
[58] Field of Search ................................. 353/54, 56, 57, 353/60, 61, 52, 119; 362/373, 294, 345, 264

[56] References Cited

U.S. PATENT DOCUMENTS

| | | | |
|---|---|---|---|
| 4,588,271 | 5/1986 | Emura | 353/66 |
| 4,787,737 | 11/1988 | Ogawa | 353/60 |
| 4,925,295 | 5/1990 | Ogawa et al. | 353/57 |
| 4,943,154 | 7/1990 | Miyatake et al. | 353/31 |
| 4,985,815 | 1/1991 | Endo | 362/373 |
| 5,285,363 | 2/1994 | Meuse | 362/293 |
| 5,374,969 | 12/1994 | Kyhl et al. | 353/119 |
| 5,420,769 | 5/1995 | Ahlgren et al. | 362/373 |
| 5,483,253 | 1/1996 | Suganuma et al. | 345/87 |

FOREIGN PATENT DOCUMENTS

8-22074 of 1996 Japan.
8-22075 of 1996 Japan.

*Primary Examiner*—William Dowling
*Attorney, Agent, or Firm*—Nestor F. Ho

[57] ABSTRACT

A thermal management system is for utilization in a compact display device. A duct is provided within the lamp housing of the display device and a high-wattage light source is mounted within the duct. Multiple cooling fins are mounted to at least one inner surface of the duct and extend into the duct. A thermal radiation absorbent coating, such as black anodization, covers the interior of the duct and the cooling fins and provides for an increased surface absorption of thermal radiation. A port within the duct, which is transparent to visible light, is utilized to direct visible light through a display assembly. An infrared filter, which is reflective or absorptive of infrared radiation, such as a so-called "hot mirror" is utilized to maintain thermal radiation within the duct and a fan is then utilized to pass cooling fluid through the duct, passing the cooling fluid over the cooling fins and removing thermal energy from the display device in a highly efficient manner.

22 Claims, 5 Drawing Sheets

METHOD AND SYSTEM FOR THERMAL MANAGEMENT WITHIN A DISPLAY DEVICE

CROSS-REFERENCE TO RELATED APPLICATION

This application is related to U.S. Ser. No. 08/623,729, filed Mar. 29, 1996, Attorney Docket No. 52539USA1A, which is assigned to the Assignee of the present application.

BACKGROUND OF THE INVENTION

1. Technical Field

The present invention relates in general to projection systems and, in particular, to thermal management systems for use within a projection system. Still more particularly, the present invention relates to an improved method and system for thermal management in a compact display device having a high-wattage lamp.

2. Description of the Prior Art

Overhead, slide and video projectors, as have been historically configured, occupy a considerable volume of space when ready for use. This is due to the fact that the needed components are large but also to limitations of optical technology and the amount of space within the device which is needed to accommodate light cones and ventilation ducts. This bulky space can be regarded as a nuisance, or at least as an inconvenience, to a user, and as a result, considerable effort has been devoted to features that result in a smaller stored unit.

Examples of efforts to downsize such projectors may be seen in U.S. Pat. No. 5,374,969, which discloses an overhead projector having a collapsible base and a folding lens arm. Another unit that folds for transforation and storage, having a different folding mechanism, is exemplified by the overhead projector sold by Minnesota Mining and Manufacturing Company (3M) under model no. 2770, where the folding and unfolding mechanism, while complex, is extremely simple to operate. U.S. Pat. No. 4,588,271 describes yet another projector which will collapse for storage.

In recent years, liquid crystal display (LCD) panels have been added to the traditional overhead projector, introducing a new use for an established technology. Such panels are electronically addressable, i.e., the appearance of the final image is controlled by electronic signals which are sent to the liquid crystal display panel. The electronic signals may come from a computer or maybe a standard video (NTSC) signal or from other suitable devices.

Initially, these liquid crystal display panels were designed as an addition to a conventional overhead projector and were added or removed at will, according to the desired mode of use of the unit. As the convenience of electronically generated and stored representations became more appreciated, a new class of presentation device appeared, often referred to as an "integrated projector." Such a unit is capable of taking input from a computer, or other signal source, and projecting an image onto a screen. Modern integrated projectors are capable of projecting useful images even in high ambient light conditions. Such units have developed a patent literature of their own, a few examples of which are outlined below.

U.S. Pat. No. 4,943,154 discloses a projector which has three "light valves" (a particular form of an addressable liquid crystal display) and a complicated optical path intended to allow the output of a white-light source to be split into red, green and blue components, imaged within the three light valves and then recombined for projection through a single lens. Such optical systems are complicated to manufacture, assemble and maintain, occupy a considerable space, weigh a substantial amount and have potential efficiency problems.

An alternate design approach is the utilization of a single liquid crystal display panel, optical path and lens and interpose in succession red, green and blue filters. As each filter moves into the optical path, the appropriate color image is formed on the liquid crystal display. Such units have been limited by the ability of a liquid crystal display to rapidly respond to changing input signals.

In devices of a compact nature such as laptop computers and related devices, as exemplified by U.S. Pat. No. 5,483,253, a liquid crystal display panel is provided which is hinged at its rear edge so that it may be folded down to become coplanar with the keyboard for storage and transportation. However, these units are normally reflective in nature, sometimes backlit and sometimes have been made detachable so that the panel may be used on an overhead projector. Recently, so-called "palm-top" organizers have also become available. These devices combine a small computer, keyboard and LCD panel and are even smaller than laptop computers mentioned above.

A problem in modern display units is effective management of thermal energy resultant from the utilization of high-energy light sources. For example, U.S. Pat. No. 5,285,363 discloses a heat transfer unit constructed utilizing a plurality of overlapping wire grids deployed behind a cold mirror which reflects visible light and transmits infrared radiation into the overlapping wire grids for removal via a ventilation system. Such as system provides enhanced efficiency in the removable of heat from the area adjacent to a reflector, but does not address the cooling of the light source, which is necessary for light source life span enhancement.

Consequently, it would be desirable and advantageous to design a compact display device which includes an improved thermal management system such that a high-wattage lamp may be utilized within a compact display device.

SUMMARY OF THE INVENTION

It is therefore one object of the present invention to provide an improved projection system.

It is another object of the present invention to provide an improved thermal management system for use within a projection system.

It is yet another object of the present invention to provide an improved method and system for thermal management in a compact display device having a high-wattage lamp.

The foregoing objects are achieved as is now described. A thermal management system is provided for utilization in a compact display device. A duct is provided within the lamp housing of the display device and a high-wattage light source is mounted within the duct. Multiple cooling fins are mounted to at least one inner surface of the duct and extend into the duct. A thermal radiation absorbent coating, such as black anodization, covers the interior of the duct and the cooling fins and provides for an increased surface absorption of thermal radiation. A port within the duct, which is transparent to visible light, is utilized to direct visible light through a display assembly. An infrared filter, which is reflective or absorptive of infrared radiation, such as a so-called "hot mirror," is utilized to maintain thermal radiation within the duct, and a fan is then utilized to pass cooling fluid through the duct, passing the cooling fluid over the cooling fins and removing thermal energy from the display device in a highly efficient manner.

All objects, features and advantages of the present invention will become apparent in the following detailed written description.

BRIEF DESCRIPTION OF THE DRAWINGS

The invention itself, as well as a preferred mode of use, further objects and advantages thereof, will best be understood by reference to the following detailed description of an illustrative embodiment when read in conjunction with the accompanying drawings, wherein.

DETAILED DESCRIPTION OF PREFERRED EMBODIMENT

Figure 1:
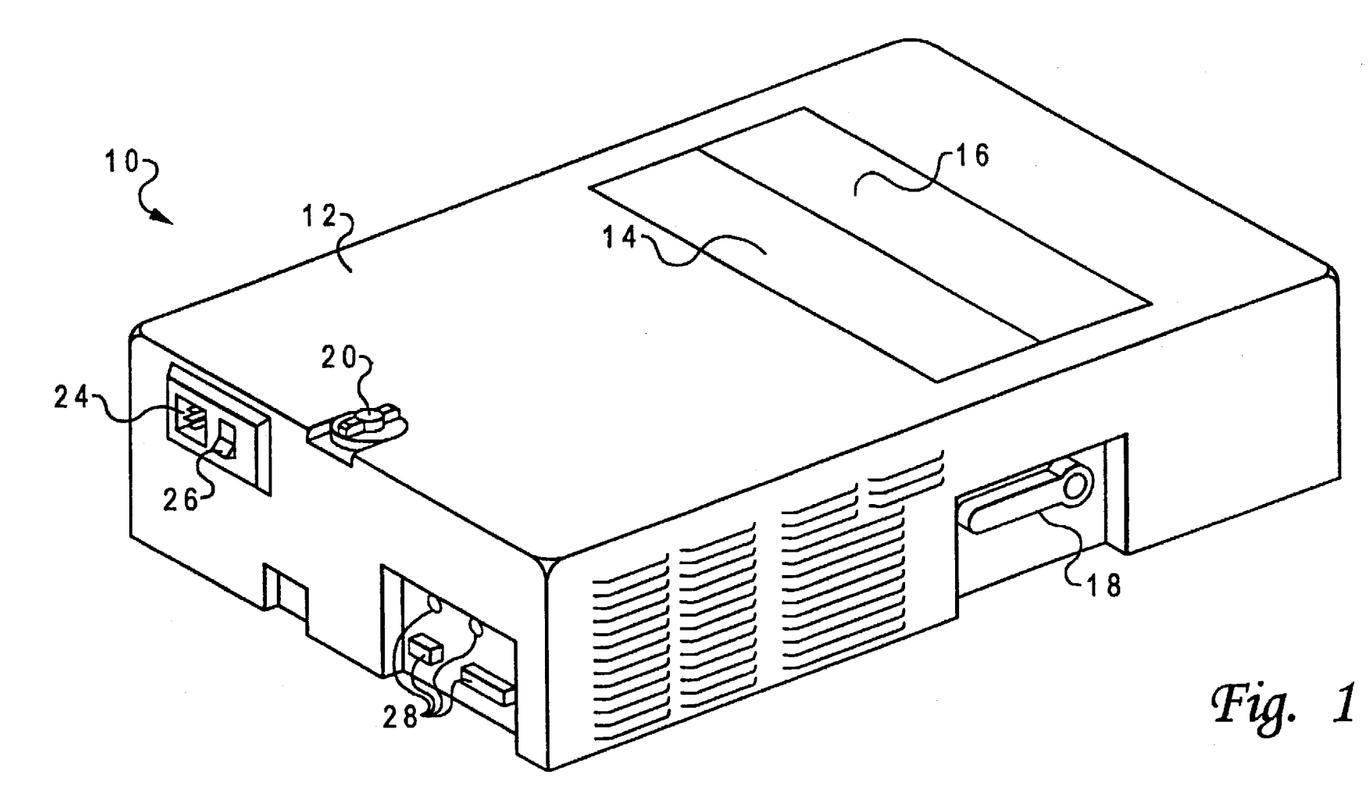
FIG. 1 is a perspective view of one embodiment of a compact integrated liquid crystal display projector incorporating the thermal management system of the present invention.

With reference now to the figures and, in particular, with reference to FIG. 1, there is depicted one embodiment 10, the compact integrated liquid crystal display projector of the present invention. Exterior features of projector 10 include a case or body 12, two upper retracting doors 14 and 16, an actuation button 18, a rear foot adjustment knob 20, a receptacle 24 for a power supply cable, a power on/off switch 26 and one or more ports providing various types of electrical connectivity (such as video and data drivers), each indicated at reference number 28.

In the depicted embodiment body 12 is box-like, and its upper surface (which includes doors 14 and 16) is planar and generally parallel with its lower planar surface when the device is in the storage/transportation state. This shape provides a particularly low profile, but as those skilled in the art will appreciate, other profiles can be provided which are not as rectangular as projector 10. Body 12 may be constructed of any durable material, preferably a lightweight polymer such as acrylonitrile butadiene styrene (ABS) or polycarbonate.

Figure 2A:
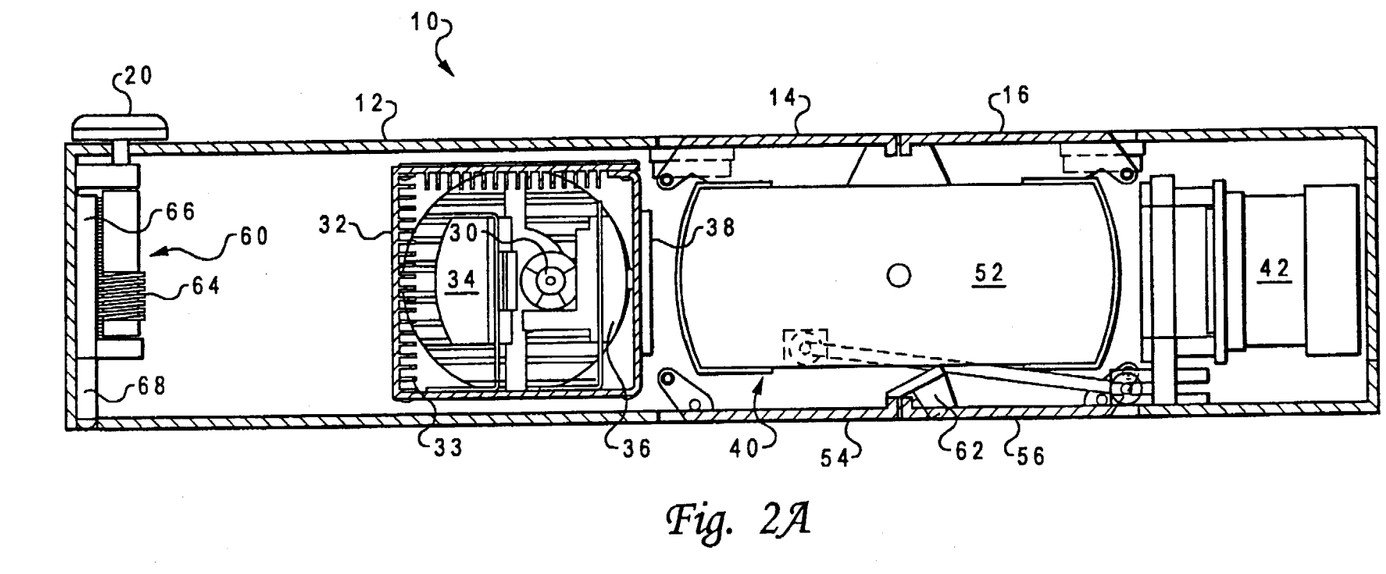
FIG. 2A is a sectional view of the compact integrated liquid crystal display projector of FIG. 1 depicted in a storage/transportation state.
Figure 2B:
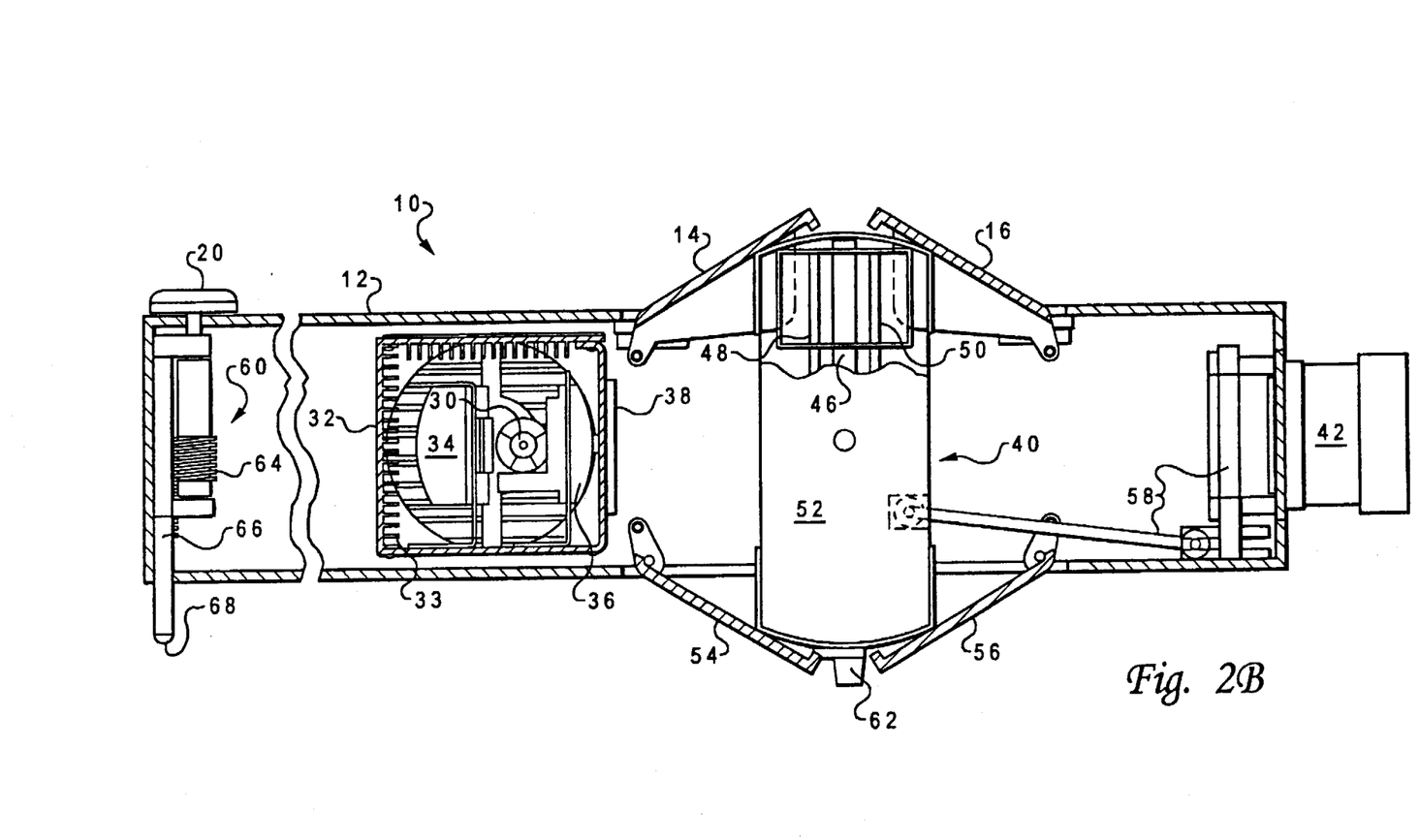
FIG. 2B is a sectional view similar to FIG. 2A showing the compact liquid crystal display projector of the present invention in a deployed state.

Referring now to FIGS. 2A and 2B, there are depicted longitudinal cross-sections of projector 10 depicting its storage/transportation state and its deployed state, respectively, which illustrate that projector 10 is additionally comprised of a light source 30 which is mounted within generally rectangular duct 32. As illustrated, two of the inner surfaces of generally rectangular duct 32 include a plurality of cooling fins 33. In a preferred embodiment of the present invention, the inner surface of duct 32 and the surface of each cooling fin 33 is coated with a thermal radiation absorbent coating such as a black anodization or black oxidation in a manner well-known in the prior art. A collimator (parabolic reflector) 34 and a condenser lens 36 oppositely disposed about light source 30, an infrared filter (hot mirror) 38 which is approximate to condenser lens 36, a display assembly 40 and a projection lens 42 are also depicted within projector 10.

All of these components are located within body 12, although as depicted in FIG. 2B, display assembly 40 and projection lens 42 may protrude from body 12 when projector 10 is deployed in a projection mode. Display assembly 40 is pivotally or rotatably attached to the inside of body 12 in a manner such that, in the deployed state, display assembly 40 is generally perpendicular to the light path, but while in a storage or transportation state, display assembly 40 is generally parallel to the light path, occupying the space that is reserved for the light cone during operation.

In referring to the cross-sectional views of FIGS. 2A and 2B, the term "longitudinal" is utilized to describe a direction of the projector which coincides with the projection access, i.e., the generally straight line between light source 30 and projection lens 42. This term is appropriate for the particular embodiment depicted, but should not be construed in a limiting sense. Other embodiments may employ folded optical paths such as by the use of mirrors, catadioptric Fresnel lenses, etc., and (while these components might add to the cost of the device and be less desirable for other reasons) such a device could still benefit from the thermal management system of the present invention.

For example, while it is certainly preferable in the depicted embodiment of the present invention to have the light strike the display assembly 40 at a generally normal angle during use, this is not a critical requirement since substantial space savings can be achieved without a full 90° rotation of the panel assembly. Further, a "keystone" correction option which modifies the shape of the image can be obtained through selection of the angle of rotation of the display panel. A stop pin or block formed on the inside of body 12 can be utilized to prevent display assembly 40 from rotating beyond a desired position.

Light source 30 is preferably a high-intensity source such as an EVD (halogen) lamp or a series of high-output metal halide lamps (e.g., 250 watt, 400 watt or 575 watt) available from Osram (a subsidiary of Sylvania & Company of Germany or Philips Electronics of The Netherlands). Light source 30 is preferably connected to a 12-volt DC power supply 44 which is located within body 12 (see FIG. 3). In the depicted embodiment, duct 32 is preferably constructed of 5052 aluminum extrusion. Condenser lens 36 is preferably plano-convex and is constructed of a borosilicate glass such as Pyrex (a trademark of Corning, Inc.). Infrared filter 38 is preferably a conventional hot mirror such as those available from Bausch & Lomb.

Display assembly 40 can take on various forms, such as a transmissive liquid crystal display panel, a light valve or a micromirror array. In the depicted embodiment of projector 10, display assembly 40 includes a liquid crystal display panel 46, such as the 6.4" panel available from Sharp of Japan or Liesegang of Germany, and further, two Fresnel lenses 48 and 50 are provided within display assembly 40 and are secured within housing 52. A fan 55 (see FIG. 3) is also mounted within housing 52 to cool liquid crystal display panel 46. The entire display assembly is arranged to pivot about a horizontal access, in the center of the assembly. Display assembly 40 can then be rotated to occupy the voids needed for expansion and contraction of the optical beams when the projector is in use. Such voids have no useful function when the projector is not in operation, and are thus generally available for component storage. Such a feature enables saving a substantial volume of space.

Along with the pivoting of display assembly 40, means may be provided to ensure protection of the display while it is in storage or in use. This means may consist of movable flaps or doors that provide a substantially contiguous exterior form when the unit is in use or in storage. As seen in FIGS. 2A and 2B, these doors include doors 14 and 16, as well as lower doors 54 and 56, all of which are pivotally attached to body 12. When display assembly 40 is rotated for use, these doors move aside to allow passage. The doors not only project the display assembly and provide more aesthetically appealing design, but also reduce light leakage.

Each of the aforementioned doors is preferably spring-loaded so as to automatically retract upon rotation of display assembly 40 to the stowed position. Projection lens 42 may also be coupled to display assembly 40, such as by linkages 58, so as to automatically retract projection lens 42 when projector 10 is configured in the storage state, and to automatically extend projection lens 42 outside of body 12 when projector 10 is configured in the deployed state. Display assembly 40 itself is preferably biased by an over-center spring which is engaged by a latch attached to button 18. This latch also locks the apparatus when stowed by locking doors 14, 16, 54 and 56 and maintains projection lens 42 in the retracted position. An iris or lens cover (not shown) may also be provided to impart additional protection to projection lens 42 when it is retracted. A lever (not visible in the figures) attached to the side of body 12 and attached to display assembly 52 may be used to simultaneously move all parts to the stowed position.

FIGS. 2A and 2B also depict a rear foot assembly 60 which, with feet 62 formed on lower retractable door 54, completes a tripod approach to levelling the unit. As can be seen, while in the deployed position, display assembly 40 rests on feet 62 and so supports body 12 and also eliminates the need to lock the LCD module in an open position in case the projector slides across a tabletop. Foot assembly 60 includes an adjustment knob 20 which is fastened to a worm gear or threaded member 64, and a rack or travel guide 66 that has one end 68 fashioned into a foot. The rear end of projector 10 may thus be raised by twisting knob 20 clockwise to adjust the pitch angle of the projection axis when the projector is resting on a support surface in order to adjust the height of the projected image. While twisting of the knob counterclockwise will lower the rear end of projector 10, foot assembly 60 is advantageously provided with a feature that allows a quick release of travel guide 66 and retraction of foot 68 into body 12. Travel guide 66 is fitted into a cavity or holder formed in or attached to body 12, but is not rigidly attached thereto. Rather, it is provided with sufficient tolerance to allow it to pull away from worm gear 64. A spring attached to travel guide 66 then automatically retracts it. Friction from the spring actually holds guide 66 against gear 64, preventing guide 66 from retracting under normal circumstances, but the user can push knob 20 laterally to displace guide 66 away from gear 64 and allow the spring to retract it.

Figure 3:
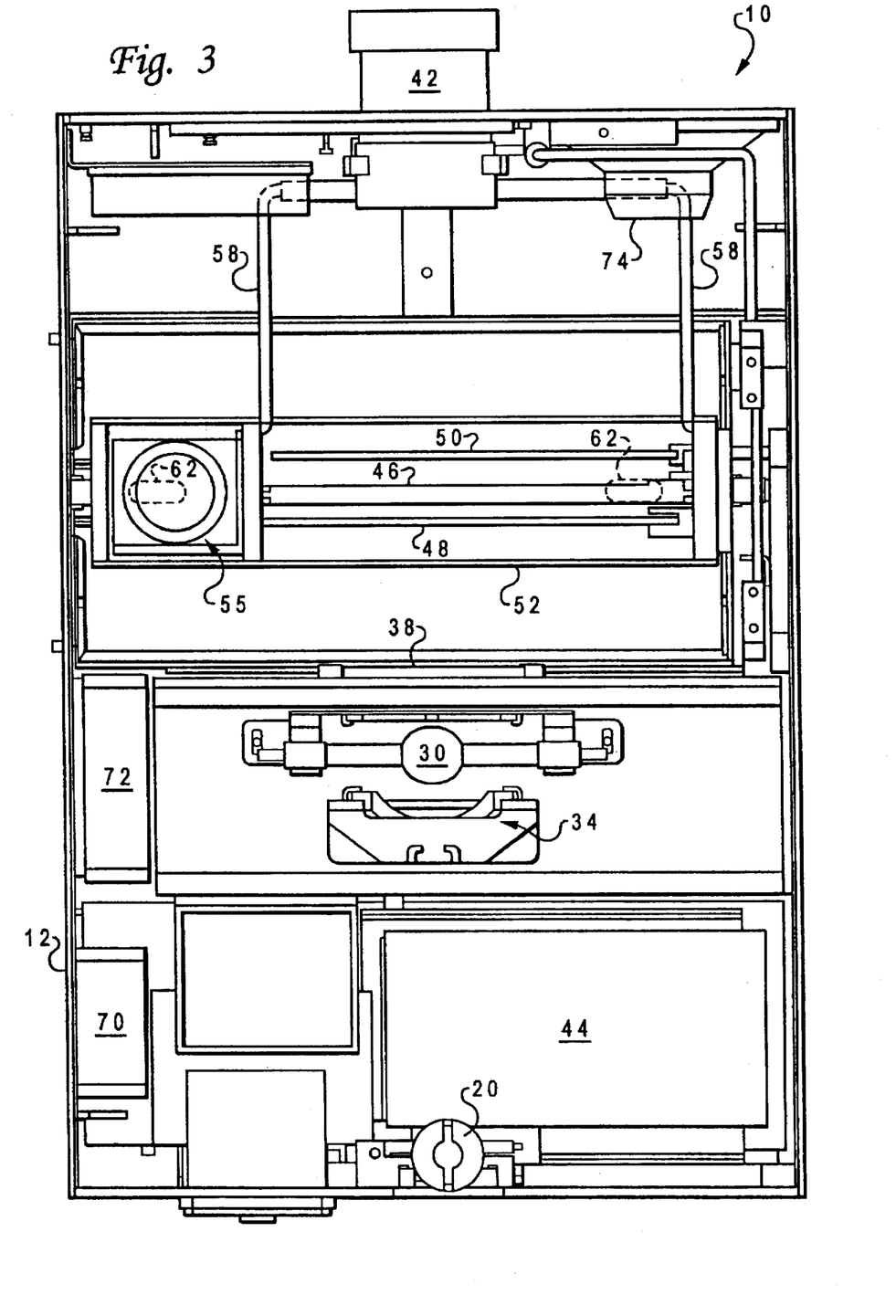
FIG. 3 is a top-plan view of the compact integrated liquid crystal projector of FIG. 1 with the upper surface thereof removed, also depicted in a deployed state.

With further reference to FIG. 3, other components of projector 10 may be seen. These components include a second fan 70 for cooling power supply 44 and a third fan 72 which is coupled to one end of duct 32 for cooling the optical module which is surrounded by duct 32, for which conduction and convection thermal cooling occurs, and an optional speaker 74. Additional electronics provided for liquid crystal display may be conventional and/or beyond the scope of the present invention except that, consistent with the goal of compactness, the electronic components are preferably packaged in a relatively small subassembly. An appropriate package is available from Neo Systems under model no. MDI-0344, and includes functionality for data and video to drive the liquid crystal display panel.

Figure 4:
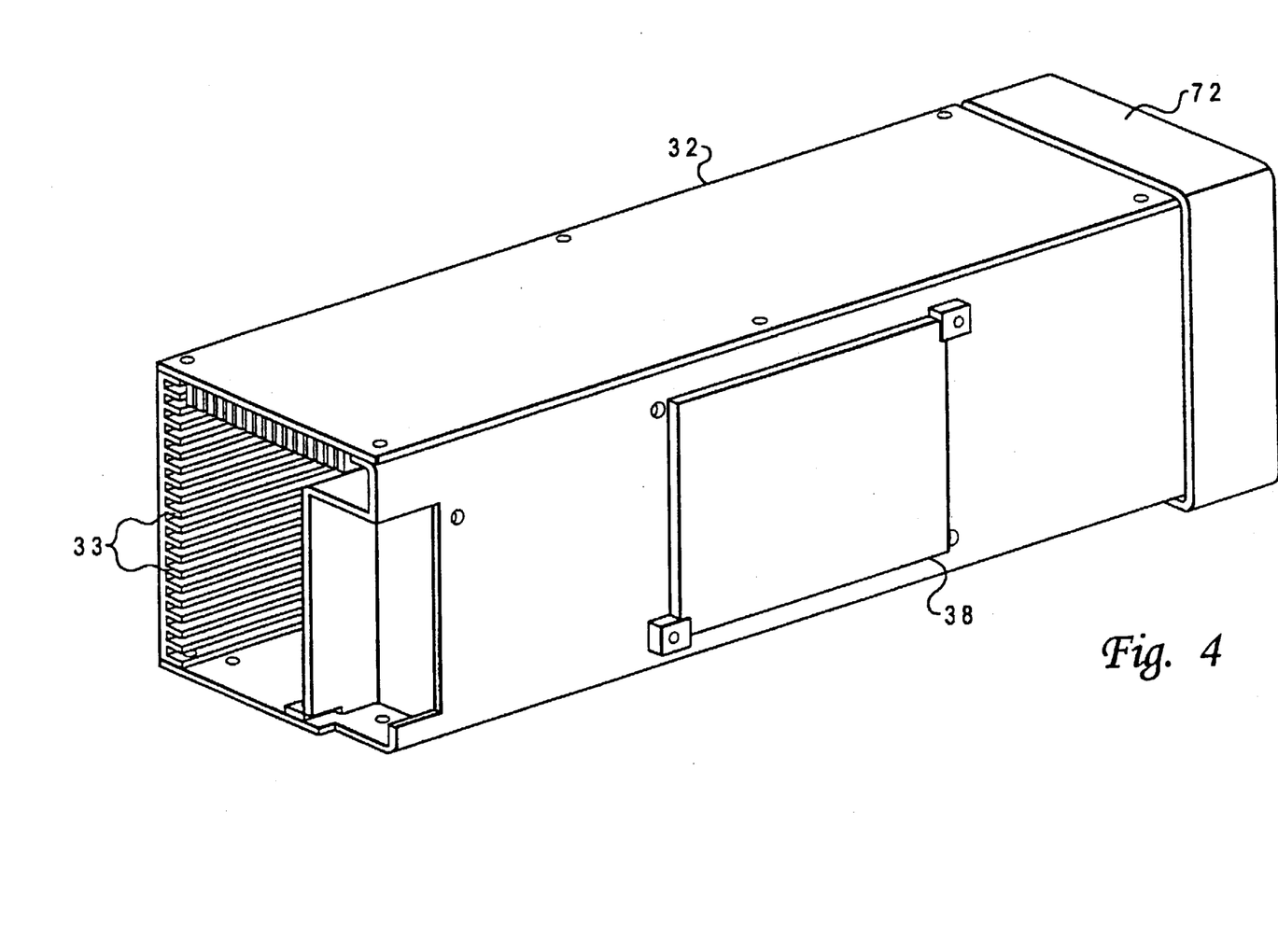
FIG. 4 is a perspective view of the novel thermal management duct utilized within the compact integrated liquid crystal display projector of the present invention.

Finally, referring to FIG. 4, there is depicted a perspective view of duct 32 which may be utilized within the compact integrated liquid crystal display projector depicted within FIG. 1. As illustrated, duct 32, in the depicted embodiment of the present invention, comprises a generally rectangular metallic duct, preferably constructed of a thermal conductive material such as 5052 aluminum. A plurality of cooling fins 33 are formed on the inner surface of two of the surfaces of duct 32 and extend inward into the interior volume of duct 32. The interior surfaces of duct 32 and the surfaces of cooling fins 33 are all preferably coated with a thermal radiation absorbent coating such as black anodization or black oxidation in order to greatly enhance the absorption of thermal energy by the surfaces within duct 32.

In the depicted embodiment of duct 32, cooling fins 33 are generally straight and extend into duct 32 in a generally perpendicular fashion from the inner surface of duct 32. The length, spacing and shape of cooling fins 33 may be varied to optimize the reflection of infrared radiation within duct 32, greatly enhancing the absorption of infrared radiation by duct 32 and cooling fins 33. Cooling fins 33 may be oblong, curved or ribbed in shape in order to maximize the reflection of infrared radiation within duct 32, dependent upon the size, shape and configuration of duct 32. Further, cooling fins 33 are disclosed as aligned parallel to the flow of cooling fluid through duct 32; however, cooling fins 33 may also be advantageously arranged to provide turbulent flow of cooling fluid to further distribute and manage thermal energy within duct 32.

As further illustrated within FIG. 4, a cooling fan 72 is mounted to one end of duct 32 and is utilized to draw cooling fluid through duct 32, eliminating excessive heat within duct 32 by passing that cooling fluid over the surface of cooling fins 38 and the inner surface of duct 32. Further, a port is provided within one surface of duct 32 which is transparent to visible light. That port is filled with infrared filter 38 which, as described above, may be provided utilizing a conventional hot mirror.

Thus, as described herein, the compact integrated liquid crystal display projector of the present invention includes a novel thermal management system comprising a duct having a plurality of cooling fins mounted to the inner surface thereof which extend into the interior volume of the duct and which are coated with a thermal radiation absorbent coating such that thermal radiation is readily absorbed by the inner surface of the cooling duct. In this manner, cooling fluid may be forced through the cooling duct to efficiently remove excessive thermal energy from within the duct, greatly enhancing the efficiency and life of the light source. In this manner, a high-wattage light source may be utilized within a relatively compact integrated liquid crystal display projector.

While the invention has been particularly shown and described with reference to a preferred embodiment, it will be understood by those skilled in the art that various changes in form and detail may be made therein without departing from the spirit and scope of the invention.

What is claimed is:

1. A thermal management system for use in a display device having a lamp housing, said thermal management system comprising:

a duct within said lamp housing for passing a cooling fluid through said lamp housing;

a light source mounted within said duct;

a plurality of cooling fins mounted to an inner surface of said duct; and a thermal radiation absorbent coating disposed upon said inner surface of said duct and said plurality of cooling fins.

2. The thermal management system according to claim 1 further including a fan for forcibly passing cooling fluid through said duct.

3. The thermal management system according to claim 1 wherein said duct is generally rectangular in shape and wherein said plurality of cooling fins are disposed along at least two sides of said inner surface of said generally rectangular duct.

4. The thermal management system according to claim 1 wherein said duct further includes a port disposed therein which is transparent to visible light.

5. The thermal management system according to claim 4 wherein said port is reflective of infrared radiation.

6. The thermal management system according to claim 4 wherein said port is absorptive of infrared radiation.

7. The thermal management system according to claim 1 wherein said thermal radiation absorbent coating comprises black anodization.

8. The thermal management system according to claim 1 wherein said plurality of cooling fins are constructed of a metallic material.

9. The thermal management system according to claim 8 wherein said metallic material is aluminum.

10. The thermal management system according to claim 1 wherein said cooling fluid comprises air.

11. The thermal management system according to claim 1 wherein said light source comprises a halogen lamp.

12. The thermal management system according to claim 2 wherein said plurality of cooling fins are arranged in an orientation parallel to the flow of cooling fluid through said duct.

13. A display device having an enhanced thermal management system comprising:

a lamp housing;

a duct within said lamp housing for passing a cooling fluid through said lamp housing;

a light source mounted within said duct;

a plurality of cooling fins mounted to an inner surface of said duct;

a thermal radiation absorbent coating disposed upon said inner surface of said duct and said plurality of cooling fins;

a display assembly having means for creating an image;

means for directing light from said light source to said display assembly, defining a light beam direction; and a projection lens positioned to receive the image created by said display assembly.

14. The display device according to claim 13 further including a fan for forcibly passing cooling fluid through said duct.

15. The display device according to claim 13 wherein said duct is generally rectangular in shape wherein said plurality of cooling fins are disposed along at least two sides of said inner surface of said generally rectangular duct.

16. The display device according to claim 13 further including means for moving said display assembly from a storage position in which said display assembly is generally parallel with said light beam direction, to a deployed position in which said display assembly is disposed at an oblique angle with respect to said light beam direction.

17. The display device according to claim 13 wherein said means for directing light from said light source to said display assembly includes:

a reflector located adjacent said light source, opposite said display assembly; and a condenser lens interposed between said light source and said display assembly.

18. The display device according to claim 13 wherein said duct further includes a port disposed therein adjacent to said light source which is transparent to visible light.

19. The display device according to claim 18 wherein said port is reflective of infrared radiation.

20. The display device according to claim 18 wherein said port is absorptive of infrared radiation.

21. The display device according to claim 13 wherein said thermal radiation absorbent coating comprises black anodization.

22. The display device according to claim 14 wherein said plurality of cooling fins are arranged in an orientation parallel to the flow of cooling fluid through said duct.

* * * * *

(12) REEXAMINATION CERTIFICATE (4460th)
United States Patent
Rodriguez, Jr. et al.

(10) Number: US 5,692,821 C1
(45) Certificate Issued: Oct. 16, 2001

(54) METHOD AND SYSTEM FOR THERMAL MANAGEMENT WITHIN A DISPLAY DEVICE

(75) Inventors: Ernesto Melquiades Rodriguez, Jr.; Xiaowei Zhao, both of Round Rock, TX (US)

(73) Assignee: Minnesota Mining and Manufacturing Company, St. Paul, MN (US)

Reexamination Request:
No. 90/005,386, Jul. 7, 1999

Reexamination Certificate for:
Patent No.: 5,692,821
Issued: Dec. 2, 1997
Appl. No.: 08/673,292
Filed: Jun. 28, 1996

(51) Int. Cl.$^7$ ........................................ B03B 21/14
(52) U.S. Cl. .......................... 353/52; 353/61; 362/373
(58) Field of Search .................. 353/52, 54, 56, 353/57, 60, 61, 119; 362/264, 294, 345, 373

(56) References Cited

U.S. PATENT DOCUMENTS

| | | | |
|---|---|---|---|
| 4,219,371 | * | 8/1980 | Larrimore ........................... 362/264 |
| 4,419,716 | * | 12/1983 | Koo .................................... 362/96 |
| 4,453,810 | * | 6/1984 | Curiel ................................. 353/55 |
| 5,419,135 | * | 5/1995 | Wiggs ............................ 60/641.15 |
| 5,669,688 | * | 9/1997 | Baar et al. ........................ 353/119 |

FOREIGN PATENT DOCUMENTS

0035526 * 3/1983 (JP).

* cited by examiner

*Primary Examiner*—William Dowling (57) ABSTRACT

A thermal management system is for utilization in a compact display device. A duct is provided within the lamp housing of the display device and a high-wattage light source is mounted within the duct. Multiple cooling fins are mounted to at least one inner surface of the duct and extend into the duct. A thermal radiation absorbent coating, such as black anodization, covers the interior of the duct and the cooling fins and provides for an increased surface absorption of thermal radiation. A port within the duct, which is transparent to visible light, is utilized to direct visible light through a display assembly. An infrared filter, which is reflective or absorptive of infrared radiation, such as a so-called "hot mirror" is utilized to maintain thermal radiation within the duct and a fan is then utilized to pass cooling fluid through the duct, passing the cooling fluid over the cooling fins and removing thermal energy from the display device in a highly efficient manner.

US 5,692,821 C1

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 13 are determined to be patentable as amended.

Claims 2–12 and 14–22, dependent on an amended claim, are determined to be patentable.

1. A thermal management system for use in a display device having a lamp housing, said thermal management system comprising:
   a duct within said lamp housing for passing a cooling fluid through said lamp housing;
   a light source mounted within said duct;
   a plurality of cooling fins mounted to an inner surface of said duct, *the inner fins being directly exposed to the light source*; and
   a thermal radiation absorbent coating disposed upon said inner surface of said duct and said plurality of cooling fins.

13. A display device having an enhanced thermal management system comprising:
   a lamp housing;
   a duct within said lamp housing for passing a cooling fluid through said lamp housing;
   a light source mounted within said duct;
   a plurality of cooling fins mounted to an inner surface of said duct, *wherein the cooling fins are directly exposed to the light source*;
   a thermal radiation absorbent coating disposed upon said inner surface of said duct and said plurality of cooling fins;
   a display assembly having means for creating an image;
   means for directing light from said light source to said display assembly, defining a light beam direction; and
   a projection lens positioned to receive the image created by said display assembly.

\* \* \* \* \*